US011839207B1

(12) United States Patent
Bond

(10) Patent No.: US 11,839,207 B1
(45) Date of Patent: Dec. 12, 2023

(54) ESSENTIAL OIL-CONTAINING FORMULATION FOR INSECTICIDE USE, FERTILIZER APPLICATION, AND/OR FERTILIZER COATING

(71) Applicant: Jerry R. Bond, Flowery Branch, GA (US)

(72) Inventor: Jerry R. Bond, Flowery Branch, GA (US)

( * ) Notice: Subject to any disclaimer, the term of this patent is extended or adjusted under 35 U.S.C. 154(b) by 345 days.

(21) Appl. No.: 17/034,104

(22) Filed: Sep. 28, 2020

Related U.S. Application Data

(60) Provisional application No. 62/909,935, filed on Oct. 3, 2019, provisional application No. 62/906,137, filed on Sep. 26, 2019.

(51) Int. Cl.
| | | |
|---|---|---|
| *A01N 31/02* | (2006.01) | |
| *A01N 25/30* | (2006.01) | |
| *A01N 65/26* | (2009.01) | |
| *A01N 65/44* | (2009.01) | |
| *A01N 65/22* | (2009.01) | |
| *C05C 9/00* | (2006.01) | |

(52) U.S. Cl.
CPC ............ *A01N 31/02* (2013.01); *A01N 25/30* (2013.01); *A01N 65/22* (2013.01); *A01N 65/26* (2013.01); *A01N 65/44* (2013.01); *C05C 9/00* (2013.01)

(58) Field of Classification Search
CPC ........ A01N 31/02; A01N 25/30; A01N 65/22; A01N 65/26; A01N 65/44; A01N 2300/00; C05C 9/00
See application file for complete search history.

(56) References Cited

U.S. PATENT DOCUMENTS

| | | | | |
|---|---|---|---|---|
| 6,159,262 A | * | 12/2000 | Tumbers | .................. C05G 5/23 |
| | | | | 71/21 |
| 6,231,865 B1 | * | 5/2001 | Hsu | ........................ A01N 65/42 |
| | | | | 424/754 |
| 2008/0293571 A1 | * | 11/2008 | Holz | ........................ C05D 9/00 |
| | | | | 504/102 |
| 2021/0276930 A1 | * | 9/2021 | Nesvadba | ................. C05C 9/00 |

OTHER PUBLICATIONS

Subbarao, G. V., K. L. Sahrawat, K. Nakahara, T. Ishikawa, M. Kishii, I. M. Rao, C. T. Hash et al. "Biological Nitrification Inhibition—A Novel Strategy to Regulate Nitrification in Agricultural Systems." Advances in Agronomy 114 (2012): 249-302. (Year: 2012).*

* cited by examiner

*Primary Examiner* — Mina Haghighatian
*Assistant Examiner* — Nathan W Schlientz
(74) *Attorney, Agent, or Firm* — Clark & Brody LP

(57) ABSTRACT

A formulation is especially suited as one or more of an insecticide, anti-viral, anti-bacterial, anti-fungicide as well as one that acts as a fertilizer and/or an enhancement to a fertilizer when the formulation is coated thereon. The formulation can be used to treat plants for pest control and/or fertilization or other areas in that require a viral, fungal, and/or bacterial treatment.

6 Claims, 1 Drawing Sheet

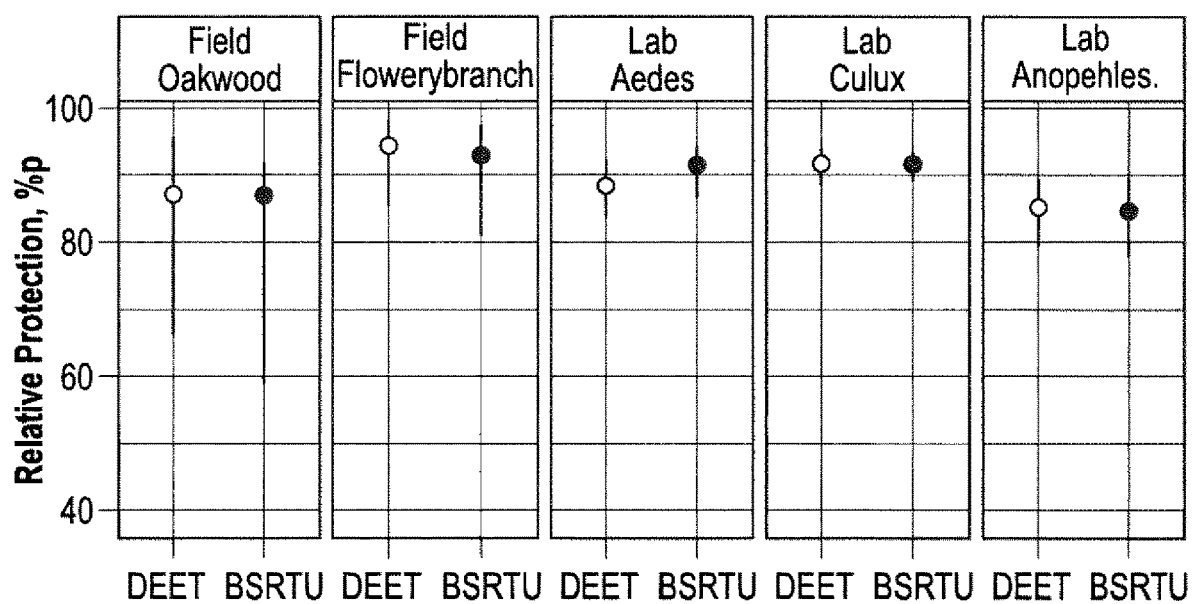

ESSENTIAL OIL-CONTAINING FORMULATION FOR INSECTICIDE USE, FERTILIZER APPLICATION, AND/OR FERTILIZER COATING

This application claims priority based on 35 USC § 119(e) from provisional applications 62/906,137 filed on Sep. 26, 2019 and 62/909,935 filed on Oct. 3, 2019, both of which are incorporated in their entirety herein.

FIELD OF THE INVENTION

The invention relates to a formulation that is especially suited as an insecticide and fungicide as well as one that acts as a fertilizer and an enhancement to a fertilizer when the formulation is coated thereon. The formulation can be used to treat plants for pest control and/or fertilization or other areas in that require an anti-viral, anti-fungal, bacterial, and/or pest control treatment.

BACKGROUND ART

A major challenge of agriculture is pest and fungal control safely for humans, pest, fish and beneficial insects. In current agricultural practices, the control of pests is often accomplished by means of the excessive use of agrochemicals, which can result in environmental pollution and the development of resistant pests. As such, there is a need to offer a better alternative to synthetic pesticides, enabling safer control of pest populations and the inventive formulation responds to this need.

SUMMARY OF THE INVENTION

One object of the invention to provide a concentrate as a formulation for treating one or more of insects, viruses, bacteria, fungus, and/or for fertilizing plants and/or improving fertilizing performance. In one embodiment, the formulation comprises, in weight percent, 51.00 to 69.00% plant-based glycerin, 7.9 to 10.70% surfactant, 6.63 to 8.98% 2-propanol, 1.30 to 1.76% lemon grass oil, 0.45 to 0.61% thyme oil, 1.09 to 1.47% cold pressed neem oil, and 16.63 to 22.49% water.

More preferred ranges for the components of the formulation are 54.00 to 66.00% plant-based glycerin, 8.37 to 10.23% surfactant, 7.02 to 8.58% 2-propanol, 1.38 to 1.68% lemon grass oil, 0.48 to 0.58% thyme oil, 1.15 to 1.41% cold pressed neem oil, and 17.60 to 21.52% water.

The surfactant of the formulation can be one or both of sodium lauryl sulfate and potassium cocoate, and the glycerin and alcohol are both non-GMO.

All components of the formulation are listed on the EPA active and inactive ingredients eligible for minimum risk pesticide products and/or are considered generally recognized as safe (GRAS).

A target composition for the formulation is 60.00% plant-based glycerin, 9.30% surfactant, 7.8% 2-propanol, 1.53% lemon grass oil, 0.53% thyme oil, 1.28% cold pressed neem oil, and 19.56% water.

The invention also includes the method of applying the formulation to achieve an intended benefit. This method involves treating an area for one or more of insects, viruses, bacteria, fungus, and/or for fertilizing plants and/or improving fertilizing performance comprising applying an effective amount of the formulation described above to the area, preferably by spraying, misting, or fogging. The method is particularly useful for treating one or more insects, and more particularly mosquitoes and mosquito larvae.

The invention also includes a method of coating a nitrogen-containing fertilizer comprising applying an effective amount of the inventive formulation to the nitrogen-containing fertilizer to reduce nitrification of the nitrogen-containing fertilizer. In this method, the formulation is sprayed onto the nitrogen-containing fertilizer at a rate of 0.25 quarts to 2 quarts of formulation per ton of fertilizer. Preferably, the fertilizer is urea.

Since the formulation comprises a concentrate, it can be diluted in any number of final concentrations depending on the particular application being considered. For example, when the formulation is used as pest/fungi control agent, it can be broadcast at a rate of about 7-9 ounces of formulation per acre. When the formulation is to be used to treat stink bugs and stink bug larvae, the formulation can be diluted to 5-70, preferably 60 ounces per gallon and then sprayed in areas containing the stink bugs and the stink bug larvae.

When the formulation is to be used to crops suffering from pest damage, the formulation can be applied to the crops in a concentration of about 10-30 ounces, preferably 20 ounces per gallon of water.

When the formulation is to be used as a maintenance treatment on crops, crops suffering from pest damage, the formulation can be applied to the crops in a concentration of about 10-30 ounces, preferably 20 ounces, per 3-7 gallons of water.

When the formulation is to be used to treat mosquitoes and/or mosquito larvae, the formulation can be applied in areas containing the mosquitoes and/or mosquito larvae in a concentration of about 10-30 ounces, preferably 20 ounces, per 1-3 gallons of water.

The different treatments described above can be repeated over time, a preferable time period being every 21 days.

BRIEF DESCRIPTION OF THE DRAWINGS

The sole FIGURE shows the comparative results of percentage protection for human landing and arm in cage testing for the inventive formulation and DEET with respect to mosquito repellency and insecticide capability.

DETAILED DESCRIPTION OF THE INVENTION

The inventive formulation includes oils that provide both insecticide and fungicide properties as well as improvements in the application of fertilizers like urea. More particularly, the formulation has the following attributes.
- it is considered a botanical formulation;
- it is considered a broad spectrum (FIFRA 25(b)) compliant pest control;
- it can be used on all crops before and after harvest and plants in general;
- it be used as a 10.10.10;
- when used to coat conventional nitrogen-containing fertilizers, it slows the loss of nitrogen from the soil;
- it is nontoxic to pollinators;
- it is anti-viral, anti-fungal, and anti-bacterial;
- it is biodegradable;
- it is effective for at least 30 days after an application;
- it can be supplied in a concentrated form and then diluted for use.
- it is safe for use around humans, animals, water, and the environment, a safe even if the formulation drifts when applied;

it is non-staining;

there is no evolved resistance in mosquitoes;

it is especially effective in controlling mosquito and their larvae, spiders, fungus, ticks, fleas, crop pests in general, flies, and gnats.

One of the oils of the formulation is extracted from the neem tree, Azadirachta indica Juss., a member of the Meliaceae family. Preferably, the neem oil is obtained by cold pressing.

Another oil is thyme oil or *Thymus vulgaris* L. Thyme oil is an active ingredient of the formulation that provides anti-fungal/anti-viral, and anti-microbial functions/pest control.

A third oil is cymbopogon, which is variously known as lemongrass, including geraniol, borneol and citronellol and it contains several hundred additional secondary metabolites used by the plant for defense. The use of the lemongrass oil also gives the formulation a pleasing lemon scent.

From the perspective of minimum risk pesticide use, the thyme and lemongrass oils are considered active ingredients. While neem oil is not technically listed in the EPA listing of active ingredients for minimum risk pesticides, the neem oil provides insect control as explained below.

These natural organic plant oils (from thyme, neem, and lemongrass) contain at least 150 biologically active compounds. Among them, the major constituents are triterpenes known as limonoids, including azadirachtin (which appears to cause 90% of the effect on most pests).

Other components present include meliantriol, nimbin, nimbidin, nimbinin, nimbolides, fatty acids (oleic, stearic, and palmitic), and salannin.

Among the botanical insecticides currently marketed, the formulation is excellent as a pest and mosquito control product, is non-toxic to humans and shows very low toxicity to beneficial organisms, and is therefore, effective for the control of many pests.

Target insect species include the following: family Culicidae, *Aedes* sanadensis, *Aedes aegypti, Aedes albopictus, Culex* genera *Culiseta* genera, *Culiseta* genera, *Psorophora* genera, *Aedes* sanadensis, *Aedes sollicitans, Aedes vexans, Anopheles*—A genus of mosquitoes with more than 430 species—*Anopheles stephensi* (Lucantoni et al., 2006), *A. culicifacies* (Chandramohan et al., 2016), *Ceraeochrysa claveri* (Scudeler et al., 2013, 2014; Scudeler and dos Santos, 2013), *Cnaphalocrocis medinalis* (Senthil Nathan et al., 2006), *Diaphorina citri* (Weathersbee and McKenzie, 2005), *Helicoverpa armigera* (Ahmad et al., 2015), *Mamestra brassicae* (Selj∪sen and Meadow, 2006), *Nilaparvata lugens* Stal (Senthil-Nathan et al., 2009), *Pieris brassicae* (Hasan and Shafiq Ansari, 2011), and *Spodoptera frugiperda* (Tavares et al., 2010). Arachnid targets include *Hyalomma anatolicum excavatum* (Abdel-Shafy and Zayed, 2002) and *Sarcoptes* scabie var. *cuniculi* larvae (Xu et al., 2010).

The neem and lemongrass oils used in the formulation are considered contact insecticides, presenting systemic and translaminar activity. These oils are believed to have broad spectrums of action, inhibiting feeding, affecting hormone function in juvenile stages, reducing ecdysone, deregulating growth, altering development and reproduction, suppressing fertility, sterilizing, repelling oviposition, and disrupting molting processes, and more. As a feeding inhibitor, these oils stimulates cells involved in feeding inhibition, causing weakness and pest death.

Azadirachtin, salannin, and other limonoids present in the oils inhibit ecdysone 20-monooxygenase. This is the enzyme responsible for catalyzing the final step in conversion of ecdysone to the active hormone, 20-hydroxyecdysone, which controls the insect metamorphosis process. While the inhibition of ecdysone 20-monooxygenase is one functionality of the formulation, this inhibition is believed to be secondary to the action of azadirachtin in blocking microtubule formation in actively dividing cells.

Moreover, azadirachtin can inhibit the release of prothoracicotropic hormone and allatotropins from the brain-corpus cardiacum complex, resulting in problems of fertility and fecundity. Meliantriol and salannin also can act to inhibit the feeding of insects, while nimbin and nimbidin can mainly present antiviral activity.

Azadirachtin and several other limonoids also interfere in mitosis, in the same way as colchicine, and has a direct histopathological effects on insect gut epithelial cells, muscles, and fatty tissues, resulting in restricted movement and decreased flight activity.

It is believed that the formulation, including the azadirachtin, is particularly effective against the major insect groups, by showing action against:

(i) Lepidoptera: antifeeding effect and increased larvae mortality;

(ii) Hemiptera: early death of nymphs in due to inhibition of development and ecdysis defects;

(iii) Hymenoptera: food intake decrease, reduced larval and pupal development, larvae death during the molting process;

(iv) Neuroptera: severe damage in the midgut cells of larvae, injury and cell death during the replacement of midgut epithelium, and changes in cocoons, with increased porosity and decreased wall thickness affecting pupation.

In another class, for Arachnida, exposure of the ixodidae group to neem oil can result in a decrease in egg hatching and caused malformation, deformities, and death of larvae and adults.

Products derived from these oils contribute to sustainable development and the resolution of pest control problems in agriculture. These products benefit from the natural properties of neem as a powerful insect growth regulator (IGR) that also affects many other organisms (such as nematodes and fungi).

Another benefit of the neem oil is its fertilizer capability for plants. That is, the formulation not only employs these specific plant extracts as oils for pest management, but the formulation also supplies nutrients to plants.

Another benefit of the formulation is that its component parts are safe for workers, there are no handling risks, and the formulation can be used throughout the entire crop production cycle and as a pest repellent, especially for mosquitos.

The formulation is also effective as a control against pupacide, larvicide and adulticide with 15 to 45 day environmental residuals on surfaces, and is particularly effective against mosquito larva.

As a biofertilizer, with the organic and inorganic compounds present in the plant material used for the formulation, the formulation acts to improve soil quality and enhance the quality and quantity of crops. The formulation can be considered to be a 10-10-10 type as the components can provide the desired levels of nitrogen, phosphorous, and potassium.

Another aspect of the invention is the improvement of nitrogen delivery in a given application. Nitrogen is one of the main nutrients required by plants for their development, and urea is one of the main sources of nitrogen fertilizer used worldwide to supply the nitrogen demand of crops. As part of the use of urea, urea hydrolysis and nitrification occurs and this results in nitrogen losses in agriculture applications.

With the formulation containing neem oil, the neem oil functions as an inhibitor to nitrification, which helps in slowing the bacterial activity that is responsible for nitrification, hence decreasing the loss of urea from the soil.

Due to their compositional complexity, the oils of the formulation can act as antifeedants, growth regulators, sterilants, anti-oviposition agents, and repellents for insect control. Other factors that have stimulated the use of the oil-containing formulation for pest control in agriculture applications are ecological and toxicological aspects with non-toxic properties to beneficial insects, humans, pets, animals, fish, plants, and the environment. The formulation is also completely bee and butterfly friendly and is one that is biodegradable.

Beside the neem, lemongrass, and thyme oils described above, the formulation also includes an effective amount of plant-based glycerin. Using plant-based glycerin in the formulation provides additional nutrients to the plants being treated. In addition, the glycerin provide efficacy for limited surface persistence. Using plant-based glycerin in the formulation provides additional nutrients to the plants being treated. In addition, the glycerin is larvacidal. The glycerin also is beneficial in terms of controlling drift of the formulation when it is applied to a particular surface or area.

Other ingredients of the formulation include an alcohol, e.g., 2-propanol or isopropanol, and surfactant, for example, sodium lauryl sulfate, potassium cocoate or a combination of both. The surfactant reduces surface tension so that the components of the formulation combine better and adherence of the formulation to applied surfaces is improved.

The alcohol, which is considered an inactive ingredient, helps in emulsifying/dissolving the components of the formulation. While isopropanol is a preferred alcohol, any alcohol from 90 to 180 proof could be employed.

While sodium lauryl sulfate is an example of a surfactant, other surfactants that would be considered acceptable form an EPA 25(b) standpoint could be used as well. Details about the EPA regulations in this regard are discussed below.

The formulation can be applied in virtually any environment that would need control of insects, fungi, viruses, bacteria, or a combination thereof. Examples of areas that could be treated with the formulation include homes (inside and outside), commercial buildings (inside and outside), crops, fields, forests, playgrounds, athletic fields, and the like. When applying the formulation, it can be sprayed, misted, or fogged for example for pests, fungicide, and insecticide recovery. When recovering for heavy pest infestation and fungus on crops, an exemplary treatment would be 10-30 ounces and preferably 20 ounces per gallon of water. However, this ratio could vary as well depending on the problem being treated.

For maintenance treatment, 10-30 ounces and preferably 20 ounces of formulation could be used for 3-7 gallons of water. For mosquito and larvae control, 10-30 ounces and preferably 20 ounces of formulation could be used for 1 to 3 gallons of water. When treating for mosquito and larvae control, the formululation could be applied, for example, to shrubs and other areas known to harbor mosquito and larvae, e.g., areas having standing water. The treatment could be done in cycles, e.g., every 21 days. However, if the infestation is heavy, treatment cycles could occur in fewer days until a decrease in infestation is noticed and then a longer cycle time could be used for maintenance purposes.

One application from the standpoint of slowing the nitrification of nitrogen fertilizers is to coat the fertilizer, e.g., urea, with formulation, with the product then becoming a slow release fertilizer and pest control agent. The coating can be accomplished simply by spraying the formulation on the fertilizer. While the amount of formulation can vary depending on application, when treating a fertilizer, an exemplary amount of formulation would be one quart per ton of fertilizer. While urea is given as an example, any nitrogen-based fertilizer could be coated with the formulation to reduce the nitrification thereof.

If the formulation is used as a pest/fungi control agent, it can be broadcast at a rate of about 7-20 ounces per acre, preferably 9-12.8 ounces per acre.

If the formulation is used to treat stink bugs and their larva, the formulation can be diluted to 60 ounces per gallon of water and then sprayed appropriately.

The formulation can also be provided as a concentrate and then appropriately diluted to the ranges shown below, or further diluted beyond the ranges if an application can use a more dilute formulation. For example, a dilution rate of approximately 1 part formulation to roughly 2 parts of water is used for the stink bug treatment.

The formulation is made solely with eligible FIFRA 25(b) (GRAS) ingredients and is believed to be generally recognized as safe by the EPA, USDA and the FDA.

Active ingredients and inert ingredients in this product are exempted under 25(b) (GRAS) of the Federal Insecticide, Fungicide and Rodenticide Act (FIFRA). From an active and inactive standpoint with regarding to FIFRA and the EPA regulations, the thyme oil and lemongrass oils are considered active ingredients and the remaining ingredients of the formulation are considered inactive. While sodium lauryl sulfate (SLS) is a preferred surfactant for use in the formulation, other surfactants similar to SLS can be used, e.g., coco glucoside or those surfactants that satisfy the 25(b) criteria of the Environmental Protection Agency (EPA). This listing of surfactants can be found in the EPA publication entitled Active Ingredients Eligible for Minimum Risk Pesticide Products (updated 2015), which is based on Federal Insecticide, Fungicide, and Rodenticide Act (FIFRA) under the Minimum Risk Exemption regulations in 40 CFR 152.35 (f). This publication is incorporated by reference in its entirety herein. For purposes of this disclosure, this listing of active ingredients is defined as EPA-approved active ingredients in pesticide products.

Also for purpose of the inactive ingredients of the formulation, alcohol and glycerin, they can be found in the EPA publication entitled "Inert Ingredients Eligible for FIFRA 25(b) Pesticide Products (revised November 2016), which is incorporated by reference in its entirety herein. For purposes of this disclosure, this listing of inert or inactive ingredients is defined as EPA-approved inert ingredients in pesticide products.

An example of a formulation (in wt. %) is set forth in the following table. In terms of the percentages, for example, 100 lbs. of formulation for the target would contain 60 lbs. of glycerin and so on. While not shown in the table below, an even more preferred range would be 5% above and below the target amounts. For example, for glycerin, this would entail a range of 57% to 63%. The other target amounts would reflect similar spreads based on a 5% deviation from the target.

| Components | Preferred Range | More preferred range | Target |
| --- | --- | --- | --- |
| plant-based glycerin (non GMO) | 51.00-69.00 | 54.00-66.00 | 60.00 |
| A surfactant such as sodium lauryl sulfate | 7.9-10.70 | 8.37-10.23 | 9.30 |
| 2-propanol (non-GMO) | 6.63-8.98 | 7.02-8.58 | 7.80 |
| lemon grass oil | 1.30-1.76 | 1.38-1.68 | 1.53 |
| thyme oil | 0.45-0.61. | 0.48-0.58 | 0.53 |
| cold pressed neem oil | 1.09-1.47 | 1.15-1.41 | 1.28 |
| water | 16.63-22.49 | 17.60-21.52 | 19.56 |

A more detailed listing of the insects that can be controlled by the formulation is provided below.

| | | |
| --- | --- | --- |
| Black-headed caterpillars | Blister beetles | Leaf miners |
| Moths and moth larvae | Cotton stainers | Flea beetles |
| Colorado potato beetles | Spindle bugs | Mealybugs |
| Various boring insects | Tomato hornworm | White grubs |
| Mexican bean beetles | Squash bugs | Boll worms |
| Fruit sucking moths | Gypsy moths | Armyworms |
| Root weevil adults | Spider mites | Mosquitoes |
| Red palm weevil | Fungus gnats | Whiteflies |
| Corn earworms | Tea mosquito | Sand flies |
| Eriophyid mites | Leaf webbers | Houseflies |
| Cabbage worms | Pulse beetle | Caterpillar worms (more on leaf eating worms) |
| Mushroom flies | Semi loopers | Bagworms |
| Japanese beetles | Leaf hoppers | Cutworms |
| Spotted beetles | Cankerworms | Lawn and root grubs |

Lace bugs
Fruit flies
Bed bugs
Pod bug
Billbugs
Sawflies
Termites
Locusts
Midges
Aphids - Root Aphid, Hibiscus aphids, and Rose aphids
Beetles
Ants
Gall
Scale insects
Thrips The active ingredient is the lemon grass oil and the ingredients of glycerin, alcohol, vanillin, and water are considered inert or inactive ingredients. While thyme oil and SLS is considered an active ingredient according to the EPA listing discussed above, for purposes of this formulation, these are considered inactive in the context of insect repellency.

If the effects of the neem oil are not needed for a particular application, the neem oil could be removed from the formulation and the concentration of the target composition and its variance in terms of 10 and 15% spreads adjusted accordingly.

Field persistence testing was performed on larvae and the results of such testing revealed the formulation to be effective in the treatment of larvae. More particularly, larvae were placed in water in a test container and the formulation at a concentration of 20 ounces per gallon of water was sprayed over the surface of the water in the test container. After 5 minutes had elapsed, a significant number of larvae were killed, thus showing the efficacy of the formulation as at least a mosquito larvacide. Field testing was also conducted on acres of agriculture and mosquito control locations and the formulation proved to be effective in controlling mosquitoes and mosquito larvae. For example, after applying the formulation at the 20 ounce per gallon concentration on a window where mosquitoes were prevalent, the mosquitos were found dead on window panes and surrounding structure like the stiles, side jambs, bottom and top rails, frame, etc., after 2 months.

The formulation was also evaluated in terms of laboratory testing, small scale field testing, and large scale testing as well as safe for beneficial insects. This testing used the target composition noted above.

Adult testing was conducted as follows. A test chamber consisted of a tight-fitting port opening for the introduction of the insecticide of uniform distribution. The atomizer was a commercially available 32 oz sprayer operated at a pressure of 12.5+0.0.5 lb. per sq. in. A discharge rate of (2 each 0.803 gm/1 sec-spray) was discharged into the Peet-Grady Chamber of 20 oz per gallon from concentrate or 15.7% from a concentrate solution of the inventive formulation.

The spray was applied through an introduction port of the chamber. Knockdown of mosquitoes was observed at the indicated intervals of 5 minutes, 10 minutes, 20 minutes. 60 minutes and, 15 days and 31 days. When the natural site adult mosquitos were exposed to the box after treatment over the first hour, the inventive formulation produced 100% mortality. At a 60-minute post exposure on day 15, mosquitoes exposed to the treated box and had a 98% mortality and at day 31 a 48% mortality was observed at 60-minute post exposure.

The effect of the formulation on mosquito larvae was also investigated. The test chamber consisted of a tight-fitting port opening for the introduction of the insecticide of uniform distribution. The atomizer was a commercially available 32 oz trigger sprayer operated at a pressure of 12.5+0.0.5 lb. per sq. in. A discharge rate of (0.803 gm/1 sec-spray) was discharged into the Peet-Grady Chamber of 20 oz per gallon from concentrate or 15.7% from concentrate solution with a glass jar containing 100 larvae. The spray was applied through introduction ports of the chamber. Knockdown of mosquito larvae was observed at the indicated intervals.

An additional study relating to the effect of the inventive formulation on mosquito larvae was conducted. In this test, larvae were harvested for the study. Using natural untreated water as control, three sets of experiments were carried out with the residual activities being monitored. The study was conducted using different sized containers. The water was allowed to stand for at least 48 hours prior to the experiment. 100 mosquito larvae (late third or early fourth instars) each of the mosquito species from field collected colonies were introduced separately into jars at specific times (24 h, (then tested) day 3 (then tested), day 7 (then tested), week 4 (then tested), week 5 (then tested), residual periods). Larval mortality was recorded at 5 min., 10 min. 20 min, 40 min, 60 min and 48 hours. post-treatment at each introduction period.

A treatment regimen was adopted: 5 sets of 3 jars (treatment at 15.8% from concentrate solution or 19.7 oz per gallon from concentrate dosage including 5 controls) One set was not subjected to any replenishment of water, one set received replacement water from natural source (the water is only topped up to the water-level mark when evaporation occurred); the other set (also 5 jars received no dosage (control) is given a daily replenishment of about 15% of water from the total tested volume so that there was a weekly turnover of the whole volume.) The daily replenishment was to simulate daily usage of water in the container.

The following table shows the details of this study.

| Active ingredient botanicals | Associated product and/or mixture | Mosquito species evaluated | Method of application | Method of assessment Peet-Grady Chamber testing |
|---|---|---|---|---|
| | | Aedes albopictus/ aegypti Aedes solicitans Culex quinquefasciatus Culex tarsalis Ochlerotatus triseriatus | | |
| BIGSHOT MAXIM | 15.7% from concentrate | Adult Larvae | Compression sprayer | Landing count |

The following tables show the results of this testing.

| Jar Control - mortality | | | | | |
|---|---|---|---|---|---|
| | Day Exposure | | | | |
| Interval check time. | Day 1 | Day 3, | Day 7, | 4 weeks | 5 weeks |
| | Larvae | | | | |
| 5-10 min | 0% | 0% | 2% | 1% | 3% |
| 20 min | 0% | 0% | 0% | 0% | 0% |
| 40 min completed in lab | 0% | 2% | 1% | 2% | 0% |
| 60 min completed in lab | 1% | 1% | 1% | 0% | 0% |
| 48 hrs completed in lab | 2% | 0% | 2% | 0% | 1% |

| Jar Treated with field water replenish to evaporated fill-mortality | | | | | |
|---|---|---|---|---|---|
| | Larvae | | | | |
| 5-10 min | 100% | 99% | 98% | 89% | 68% |
| 20 min | 100% | 100% | 100% | 91% | 71% |
| 40 min completed in lab | 100% | 100% | 100% | 89% | 78% |
| 60 min completed in lab | 100% | 100% | 100% | 91% | 81% |
| 48 hrs completed in lab | 100% | 100% | 100% | 100% | 89% |

| Jar Un-Treated with natural field water replenish - mortality | | | | | |
|---|---|---|---|---|---|
| | Larvae | | | | |
| 5-10 min | 100% | 99% | 98% | 98% | 99% |
| 20 min | 100% | 100% | 99% | 98% | 100% |
| 40 min completed in lab | 100% | 100% | 100% | 100% | 100% |
| 60 min completed in lab | 100% | 100% | 100% | 100% | 100% |
| 48 hrs completed in lab | 100% | 100% | 100% | 100% | 100% |

This study showed significant mortality rate using the inventive formulation.

An outdoor assessment of the inventive formulation was also conducted. The test site for outdoor fogging trial was an open space measuring more than 43560 sf, approximately 1 acre. The following environmental parameters were recorded for the trial: time of spraying (30 minutes), temperature (80 F to 85 F), relative humidity (81%) (no rainfall when spraying). In addition, wind direction and velocity (0.5-3.0 m/s) was also recorded in the outdoor trial. For the outdoor trial, the back pack fogger was sprayed at 20 ounces per gallon from concentrate or 15.7% solution from concentrate, with the head nozzle pointing upwards at an angle of 30 degrees to the horizontal plane. The sprayer traveled around the area perpendicular to the spray angle at a speed of 3-5 mph.

The efficacy of the insecticide was assessed at 20 and 75 meters (a total of 2 checkpoints) downwind of the Backpack sprayer. Water sensitive papers were set at each check point as indicators of the presence of the insecticides at each of the check points. The adulticidal effect was assessed by keeping twenty adult mosquitoes of the respective mosquito species in a cylindrical cage constructed of fine mesh fabric (nylon) with wire frame support (diameter 10 cm×height 15 cm×tapping cover 10 cm). One mesh size, 0.5 mm was used. For *Aedes, Culex* quinquefaseiatus and *Aedes albopietus*, the respective caged mosquitoes are placed approximately 1.5 meters above the ground at each checkpoint. Knockdown of mosquitoes are read at 0, 10, 20 30, 40- and 60-minutes postspraying. After field exposure of 30 minutes, the mosquitoes were brought back to the laboratory at a temperature of 80-85 F and relative humidity of 80-85% rH % and transferred into clean polyethylene cups with 10% sucrose pad. The 0, 10, 20- and 30-minute knockdown readings were read in the field, while the 40- and 60-minute knockdown readings were read in the laboratory. The transportation time between field and laboratory was about 15 minutes. Mortality of mosquitoes is recorded at 24 h post treatment. The same protocol was followed for the control using water. The Larvicidal effect was assessed by placing twenty larvae of the respective mosquito species in separate paper cups on the ground below the adult cages. After field exposures of approx. 32 minutes, the larvae were brought back to the laboratory and kept in a laboratory environment at a temperature of 83 to 85 F and relative humidity of 65-85%. Mortality of larvae were recorded at 24 h post treatment. The droplet size of the STIHL fogger is listed as 5-25-microns droplet size in the equipment literature.

100 mosquitos-field captured placed in each 10 cm×15 cm (4×6-inch mesh fabric nylon trap with 4-inch trap cover). Male, female representative of common species in Georgia. The results of the study are shown in the following two tables.

| Trap A - mortality 20 meters from spray downwind, (85/cm$^2$) Water sensitive paper Interval check time - post spray. | |
|---|---|
| | Adult |
| 0 min | 0% |
| 20 min | 48% |
| 40 min completed in lab | 87% |
| 60 min completed in lab | 91.8% |
| 48 hrs completed in lab | 99.8% |

Trap B - mortality
75 meters from spray downwind, (60/cm²)
Water sensitive paper
Interval check post spray.

|  | Adult |
|---|---|
| 0 min | 0% |
| 20 min | 32% |
| 40 min completed in lab | 58% |
| 60 min completed in lab | 71% |
| 48 hrs completed in lab | 99.7% |

(87%-99.7% reduction) were greatest in the 48 to 72 hours

Water sensitive paper utilized at each field test location to determine coverage—Syngnta Teejet water sensitive paper 52×76 mm. Research and experience suggest that 85 discrete fine/medium-sized droplets per square centimeter and a total coverage of 15% should be sufficient for most foliar insecticides and fungicides. The papers won't show the finest droplets (<50 μm), so there may be a greater coverage of spray even though it was not observed. The machines used to apply the barrier application appeared to be critical to the effectiveness of the application against mosquitoes. The vegetation leaves treated with a STIHL backpack sprayer showed deposition on the top versus the bottom of leaves and peak deposition occurred 1.2 m into the vegetation. Droplet coverage was significantly affected by sprayer type, card depth, and vegetation height. The inventive formulation product had none to minimal effect on beneficial insect populations, no reported effect on *Apis, Bombus*, Nymphalidae or Vespidae.

After evaluations the 15.7% formulation from concentrate of the inventive formulation was carried out. The trial was conducted in a residential area of Florida. This field trial was conducted in collaboration with a national mosquito control company. A total of 50-60 houses were chosen for the Big Shot Botanical mosquito control evaluation. The Botanical organic inventive concentrate mosquito control product was field evaluated on blocks of properties in several neighborhoods in (Palm Beach Florida) for 4 weeks from Sep. 1, 2019 to Oct. 2, 2019. The Properties were treated by commercial operators using backpack mist blowers. The technicians using the product preferred it over the current bifenthrin and pyrethrin based products. No resprays were needed over the 30 days. Control of the mosquito populations were improved and the public preferred the inventive formulation as a safe and friendly natural mosquito control product.

Additional testing was conducted comparing the inventive formulation to DEET for the purposes of comparing insect repellency. In many insect repellency studies, there is often a lack of side-by-side comparisons for two or more insect repellents. The study conducted in connection with the inventive formulation sought to address this problem by directly comparing the two insect repellents based on the same active contents, i.e., 15% by weight. The study was conducted using both field testing and laboratory conditions. The tested formulation included ethanolic solutions of 15% DEET (m/m) and 15% of the inventive formulation, and the composition tested corresponded to the target composition described above.

The efficacy of topical mosquito repellents is usually tested following various national or international guidelines. Under laboratory conditions, the efficacy of mosquito repellents is typically evaluated in the so-called "arm-in-cage" (AIC) test. In the AIC test according to the guidelines, a forearm of a study participant is treated with a defined amount of the repellent formulation (e.g. 1 ml per 600 cm$^2$). Then the participant exposes the treated forearm at regular intervals (e.g. every half hour) to a number (e.g. 200) of host-seeking female mosquitoes for a defined exposure period (e.g. 3 minutes) in a cubic cage (e.g. 64,000 cm$^3$). The endpoint is usually the complete protection time (CPT) or the relative protection percentage (% p). CPT corresponds to the time from the application of the formulation until its failure, while the relative protection is the percentage protection provided as compared to an untreated forearm. In the field, similar endpoints may be determined on the basis of mosquitoes landing or biting on an exposed skin area, usually the lower leg, while the mosquitoes are collected by aspiration allowing for the identification of the mosquito species in a laboratory.

The field experiments used a human landing catch method. In preparation of the field experiments, the test surface (i.e. the bare lower leg) was washed with neutral soap, rinsed, dried. One of the lower legs was then treated with either one of the two repellent formulations at a rate of 1 ml per 90 square inches. The application volume was estimated on the basis of the surface area, calculated as the average of the circumferences just below the knee, the calf and the ankle, multiplied by the length of the lower leg, measured from below the knee to the ankle.

Sixty minutes after application of the treatment the study participant situated to one position location. With the exception of the treated lower leg the whole body was fully protected from mosquito bites by a tyvek suit, a bee keepers hat and latex gloves through which mosquitoes could not bite. During an exposure period of 30 minutes the study participant sat on a stool and collected any mosquito alighting on the exposed lower leg using a mouth aspirator. Collected insects were transferred to 250 ml jar with netted cover mesh. When natural light conditions were insufficient to carry out collections the study participants used a head lamp (LED).

The laboratory experiments were conducted following the WHO guidelines for the AIC test. In the AIC test the protection time of a repellent is assessed by exposing a treated forearm to hungry mosquitoes at regular intervals (grown from larvae and not fed for 12 hours before the test). The cages measured 16"×16"×14" and were made of clear glass with an opening on the front side. At the bottom of the cage was a mirror positioned allowing for observation of mosquitoes landing on the lower side of the arm. The back side of the cage was made of a fine metal grid to ensure air supply during the experiments.

The arm-in-cage (AIC) test was used or measuring the efficacy of topical mosquito repellents under laboratory conditions. Hungry female mosquitoes are contained in a test cage and the repellent is applied to the forearm between the wrist and elbow, while the hand is protected by a latex glove through which the mosquitoes cannot bite. The test cages contained 200 to 220 host seeking 5 to 10-day-old females of one of the 3 main mosquito species; *Aedes, Culex* and *Anopheles*. The three mosquito species are among WHO recommended model organisms. Adult mosquitoes were fed with 10% sucrose solution and water as needed. Testing and rearing conditions for all mosquito colonies were 80° F.±1.2 and 64.8%±2.0% relative humidity and a 12:12 (light/dark) photoperiod. Male and female mosquitoes were kept in the same rearing cages to allow mating to occur.

*Aedes* experiments were performed under artificial light at an intensity of 630 Lux, while tests with Anopehles and *Culex* were conducted under subdued light at an intensity of 50 Lux to mimic the conditions according to the mosquito species diurnal biting patterns. Twelve hours before the experiment the sugar water was removed from the cage and the mosquitoes had only access to water.

Before exposure to the mosquitoes the forearm was washed with odorless soap, dried with a towel, swabbed with an 70% isopropanol wipe and then dried again. Then, to assess the readiness of the mosquitoes to land, the forearm of a study participant was exposed in the experimental cage for 60 seconds or until 10-15 landings were counted. A landing was defined as a mosquito lighting on the skin and remaining for at least 2 seconds. After measuring the landing activity with the untreated forearm, the forearm was treated from wrist to elbow with either the inventive formulation or 15% DEET at an application rate of 1 ml per 600 $cm^2$. In order to estimate the application volume, the surface area of the forearm was calculated as the average circumference of the elbow, wrist and middle of the forearm multiplied by the distance between the wrist and the elbow. The volunteer tested only one repellent per day. Thirty minutes after application of the repellent the participant exposed the treated forearm in the test cage for 3 minutes or until 10 mosquitoes landed. The procedure was then repeated every 30 minutes over 6 hours. The duration until the first, second and tenth landing of a mosquito on the treated forearm was noted. During the exposure time the mosquitoes were shake off before they started biting, preventing an excessive number of bites. At the end of the experiment the arm was again washed and dried as before, and a second control measurement of the mosquitoes' landing activity was taken.

Raw data was recorded on paper forms. Each entry was double-checked and the records were inspected for outliers and inconsistencies. The endpoint measured in the experiments was the number of mosquitoes landing on the bare skin during each exposure period. Based on the number of landings and exposure times two outcome measures were estimated following the WHO guidelines: the complete protection time (CPT) and the percentage protection (% p) over time. Here, the percentage protection (% p) over time is defined as the time elapsed between the application of the repellent and the first mosquito landing. Average CPTs (median and 95% confidence interval). For the field data, landing rates were shown as a function of treatment, time post application and location. Landing rates in the AIC test were demonstrated as a function of treatment time post application and mosquitos. In both models an offset term with the log of the exposure time was introduced to capture the differences in exposure times between tests. For example, the study participant was allowed to conclude an exposure after 10 landings in the AIC test, leading to different exposure times. As for the landing rates average % p over the 6 hours test period was estimated using the total number of landings per person per second and then compared between the inventive formulation and 15% DEET. The same approach was also used to compare the control landing rates in the AIC test before and after the experiments.

The results from the comparative study between the AIC test and the HLC method in the field revealed comparable efficacy for 15% PMD and 15% DEET are shown in sole FIGURE of this application, which illustrates a table that shows the relative protection percentages for two different field studies and three AIC studies for three different types of mosquitoes.

The median CPTs in the AIC tests were 0.5, 2, and 2 hours for *Aedes, Anopheles*, and *Culex*, respectively. The median CPTs in the AIC tests for the inventive formulation were 0.5, 1, and 0.5 hours for *Aedes, Anopheles*, and *Culex*, respectively. The CPTs measured in the field were at least 6 hours for both the inventive formulation and 15% DEET. In contrast to the CPTs, relative protection percentage or % p did not vary greatly between the laboratory and field experiments as shown in the sole FIGURE. The repellent efficacy is estimated by CPT or % p and the relative outcome between the inventive formulation and 15% DEET remains about the same.

Although DEET is deemed nontoxic is used correctly, some concerns still exist about its safety. Moreover, DEET has plasticizing properties, a strong smell, and may even cause discomfort, particularly when applied at high dosages. Since none of these issues exist with the all-natural inventive formulation, the inventive formulation's insect repellency being on a part with DEET is a significant advantage.

The inventive formulation may also be effective in treating citrus greening. This disease is a serious problem in the citrus industry.

As such, an invention has been disclosed in terms of preferred embodiments thereof which fulfill each and every one of the objects of the present invention as set forth above and provides a new and improved formulation that can be safely used for one or more of pest control, as a nitrogen-containing fertilizer enhancer, a fertilizer, anti-fungal, anti-viral, and/or anti-bacterial treatment.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A method of coating a nitrogen-containing fertilizer consisting of applying an effective amount of a formulation to the nitrogen-containing fertilizer to reduce nitrification of the nitrogen-containing fertilizer, the formulation consisting of, in weight percent:
   1.09 to 1.47% cold pressed neem oil;
   ingredients listed in EPA Inert Ingredients Eligible for FIFR A 25(b) Pesticide Products (Revised November 2016) and Active Ingredients Eligible for Minimum Risk Pesticide Products (Updated December 2015), said ingredients consisting of 51.00 to 66.00% plant-based glycerin, 7.9 to 10.70% surfactant, the surfactant selected from the group consisting of sodium lauryl sulfate and potassium cocoate, 6.63 to 8.98% 2-propanol, 1.30 to 1.76% lemon grass oil, 0.45 to 0.61% thyme oil; and 16.63 to 22.49% water.

2. The method of claim 1, wherein the formulation is sprayed onto the nitrogen-containing fertilizer at a rate of 0.24 L to 1.89 L of formulation per 907.19 kg of fertilizer.

3. The method of claim 1, wherein the fertilizer is urea.

4. The method of claim 1, wherein the plant-based glycerin ranges from 54.00 to 64.00%, the surfactant ranges from 8.37 to 10.23%, the 2-propanol ranges from 7.02 to 8.58%, the lemon grass oil ranges from 1.38 to 1.68%, the thyme oil ranges from 0.48 to 0.58%, the cold pressed neem oil ranges from 1.15 to 1.41%, and the water ranges from 17.60 to 21.52%.

5. The method of claim 4, wherein the plant-based glycerin is 60.00%, the surfactant is 9.30%, the 2-propanol is 7.8%, the lemon grass oil is 1.53%, the thyme oil is 0.53%, the cold pressed neem oil is 1.28%, and the water is 19.56%.

6. The method of claim 1, wherein the surfactant is one or both of sodium lauryl sulfate and potassium cocoate, and the glycerin and 2-propanol are non-GMO.

* * * * *